(No Model.) 2 Sheets—Sheet 1.

J. SERSON.
GALVANIC BATTERY.

No. 338,194. Patented Mar. 16, 1886.

WITNESSES
H. E. Barry
William Garvey

INVENTOR
James Serson
by Jos. H. Dowes
Atty.

(No Model.) 2 Sheets—Sheet 2.
J. SERSON.
GALVANIC BATTERY.
No. 338,194. Patented Mar. 16, 1886.
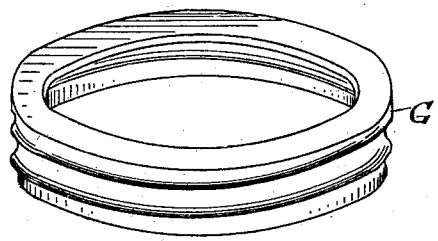
Fig. 3.
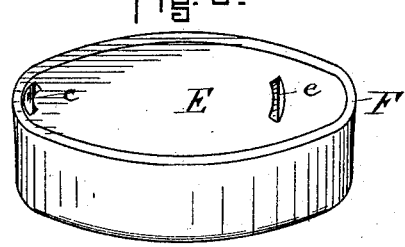
Fig. 4.
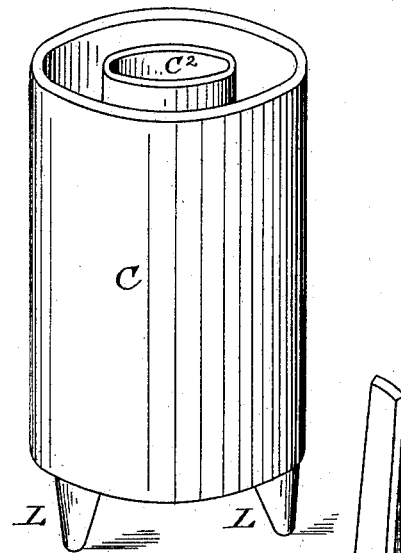
Fig. 6.
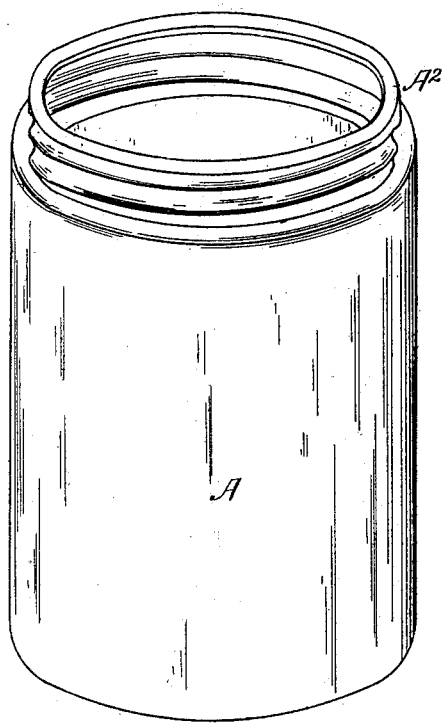
Fig. 5.
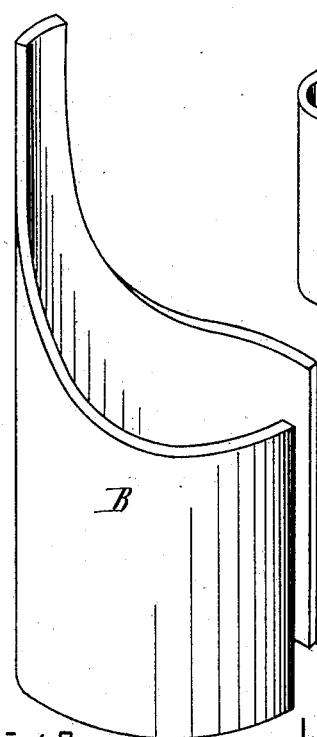
Fig. 7.
Fig. 8.
WITNESSES
H. E. Barry,
William Garvey.
INVENTOR
James Serson
by Wm B. H. Dowse
Atty.

UNITED STATES PATENT OFFICE.

JAMES SERSON, OF BOSTON, MASSACHUSETTS, ASSIGNOR OF ONE-HALF TO WILLIAM WALSH, OF SAME PLACE.

GALVANIC BATTERY.

SPECIFICATION forming part of Letters Patent No. 338,194, dated March 16, 1886.

Application filed October 8, 1885. Serial No. 179,311. (No model.)

*To all whom it may concern:*

Be it known that I, JAMES SERSON, residing at Boston, in the county of Suffolk and Commonwealth of Massachusetts, have invented certain new and useful Improvements in Galvanic Batteries, of which the following is a full, clear, and exact description, such as will enable others skilled in the art to which it pertains to use the same, reference being had to the drawings, and to the letters of reference marked thereon, which form a part of this specification.

My invention relates to improvements in galvanic batteries of the class using a zinc positive element, a carbon negative element, and a bichromate-of-potash solution as a depolarizing liquid.

My invention consists in certain improvements in the construction of the outer jar, inner cell, and electrodes, whereby I am enabled to charge my batteries in a way to obtain the most effective results.

The object of my invention is to produce a battery of high electro-motive force and of long continuance. This I do by the construction of my battery.

In chromate batteries as at present constructed the bichromate-of-potash crystals are placed in the bottom of the outer jar in direct connection with the carbon electrode, which soon becomes covered with crystals, causing the action of the battery to stop. Another disadvantage is the crystallization of the zinc plate with chromic alum formed by the chemical reaction which takes place in the battery. I avoid, also, by the construction I have shown herein the necessity of frequently taking the cell apart and cleaning the different elements.

In bichromate-of-potash batteries it has been true heretofore that the action of the battery has stopped long before the bichromate of potash has been entirely used. By charging the battery in the manner herein described, I am enabled to keep the battery in action until all the bichromate of potash is completely exhausted. This improved cell of mine is also hermetically sealed, so that any evaporation or throwing off of gases, with the injuries thereby produced, is prevented. By having a cell closed as I have described I am enabled to transport it with perfect safety. It thus becomes a very desirable cell in railroad-cars.

Figure 1:
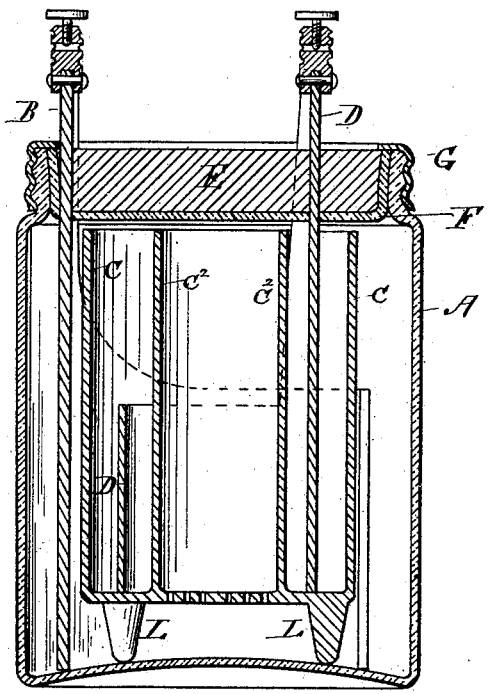
Figure 2:
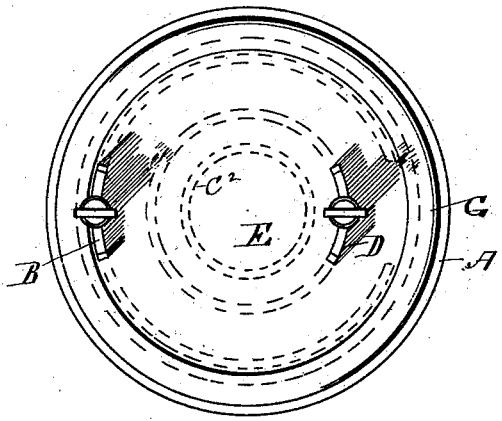

In the accompanying drawings, Figure 1 is a sectional view of my improved battery as arranged or set up for action. Fig. 2 is a top plan view of the same. Fig. 3 is a perspective view of the ring or cap G for holding the top in position and for covering the joint between the top and the outer jar. Fig. 4 is a perspective view of the top or stopper of the outer jar. Fig. 5 is a perspective view of the outer jar. Fig. 6 is a perspective view of the inner porous cell. Fig. 7 is a perspective view of the zinc electrode D. Fig. 8 is a perspective view of the carbon electrode B.

A is the outer porous cell, of glass or any other suitable material, having a screw-threaded neck, $A^2$. The inner porous cell, C, has within it an inner chamber, $C^2$, which is supported on legs L L L. The bottom of the inner chamber, $C^2$, is perforated with holes, as shown in Fig. 1.

E is a stopper or top cover, made of cork or rubber. I preferably, however, make it of cork and cover it with rubber F, with holes $e\ e$ for the poles of the electrodes.

In charging my battery I place with the zinc electrode in the chamber of the porous cup about three ounces of free mercury to allow of a continuous reamalgamation, an acid, preferably sulphuric acid, and water, using, preferably, the proportion of one part acid to twenty parts of water. I fill the inner chamber, $C^2$, of the porous cup with bichromate-of-potash crystals. In the outer jar with the carbon electrode I place sulphuric acid and water, using, preferably, one part sulphuric acid to six parts of water. By placing the bicarbonate-of-potash crystals in the inner chamber, $C^2$, I cause the solution in the outer jar to charge itself. By thus feeding the depolarizing solution I am enabled to obtain a fluid in every way adequate to produce a high electo-motive force and of long continuance.

Having now fully described my invention, what I claim is—

1. A porous cup supported on legs and provided with an outer and inner chamber, the bottom of the inner chamber being perforated and raised, as described, whereby the solution surrounding the porous cup is given free access to the lowest portion of the element contained in the inner chamber, substantially as described.

2. A galvanic battery consisting of an outer jar, a porous cup resting on legs and provided with an outer and inner chamber, the said inner chamber having a perforated bottom, a carbon electrode surrounding the porous cup, a zinc electrode in the outer chamber of the porous cup, bichromate-of-potash crystals in the said inner chamber, a solution of sulphuric acid and water in the outer chamber of the porous cup and also in the outer jar, substantially as described.

3. A galvanic battery consisting of an outer jar, a porous cup having an outer and inner chamber, and legs to support it above the bottom of the jar, zinc and carbon electrodes, the solution used to charge the cell, substantially as described.

4. A galvanic battery consisting of the jar A, the porous cell C, supported on legs and having an inner chamber, $C^2$, a zinc electrode, D, a carbon electrode, B, a charging solution, the stopper E, and ring G, all arranged substantially as described.

5. A galvanic battery consisting of an outer jar, A, provided with a tight cover, a porous cup, C, made as described, a zinc and carbon electrode, a charging-fluid of acid (preferably sulphuric acid) and water in the outer jar and outer chamber of the porous cup, and bichromate-of-potash crystals in the inner chamber of the porous cup, substantially as described.

6. In a galvanic battery, a cup and cell supported above the bottom of the jar, provided with two chambers having no connection with each other, the inner chamber having a perforated bottom, substantially as described.

In testimony whereof I have hereunto set my hand.

JAMES SERSON.

Witnesses:
WM. B. H. DOWSE,
WILLIAM GARVEY.